United States Patent [19]

O'Brien

[11] 4,043,443

[45] Aug. 23, 1977

[54] FRUIT SUB-SAMPLER AND GRADING TABLE

[75] Inventor: Michael O'Brien, Davis, Calif.

[73] Assignee: The Regents of the University of California, Berkeley, Calif.

[21] Appl. No.: 613,251

[22] Filed: Sept. 15, 1975

[51] Int. Cl.[2] .................................... B65G 47/26

[52] U.S. Cl. .................................... 198/525; 193/31 R; 198/445; 198/530

[58] Field of Search ............ 198/31 R, 30, 25, 31 AC, 198/81, 31 AA, 31 AB, 50, 51, 447, 445, 525, 530; 193/31 R, 31 A

[56] References Cited

U.S. PATENT DOCUMENTS

| | | | |
|---|---|---|---|
| 1,243,566 | 10/1917 | Souder | 198/31 AC |
| 1,890,740 | 12/1932 | Marasso | 198/25 X |
| 2,821,280 | 1/1958 | Miklofsky | 193/31 R |
| 3,810,554 | 5/1974 | London et al. | 198/446 X |

*Primary Examiner*—Evon C. Blunk
*Assistant Examiner*—Douglas D. Watts
*Attorney, Agent, or Firm*—Lothrop & West

[57] ABSTRACT

A fruit sub-sampler and grading table, especially for use with canning tomatoes, includes a frame. A measured supply of tomatoes is discharged at the entrance end of the frame and as it progresses toward the exit end of the frame is divided longitudinally into two streams. The first stream as it further advances is split to follow a primary path and a parallel but transversely spaced secondary path. Separate belt conveyors individually continue the two paths and are separately controllable as to speed by a pair of inspectors who transfer certain fruit from the belt conveyors to individual containers. These are disposed in the space between the conveyors and are supported on the frame by load cells connected to display individual container weights. Fruit discharged from the exit end of the belt conveyors is carried by a return conveyor toward the entrance end of the conveyor. Fruit in the second stream is discharged over a random selection drum. Fruit segregated by the drum is retained for special inspection, and the remainder of the second stream passing the drum is released to the return conveyor or is intercepted and discharged from the machine.

11 Claims, 3 Drawing Figures

FIG-2
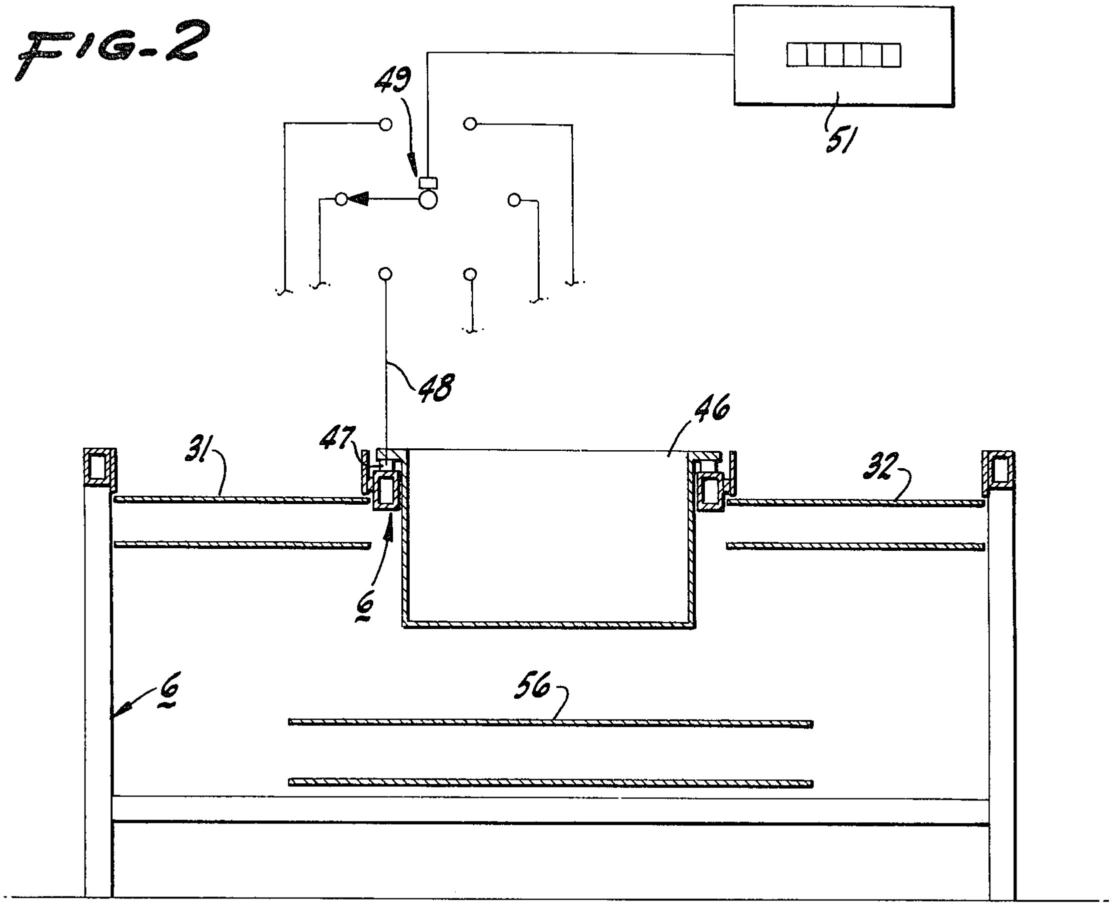
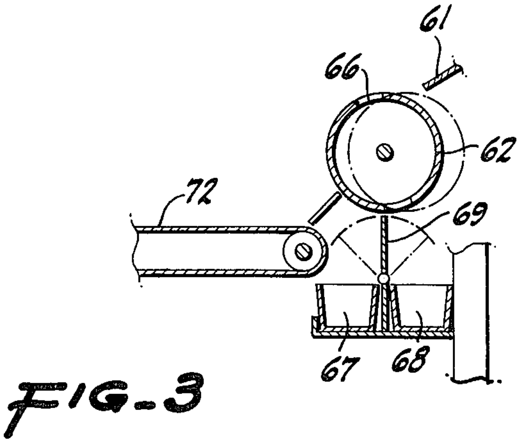
FIG-3

FRUIT SUB-SAMPLER AND GRADING TABLE

In the handling of various fruits, and particularly tomatoes for processing, the volume that must be inspected each season has increased markedly, and the inspection requirements have likewise increased drastically.

For example, in California during recent seasons over six million tons of tomatoes were delivered each season to canneries for processing. The tomatoes were delivered in bulk from the growing areas to the canneries in double trailers of the gondola type, each trailer load being approximately 25 tons. It has been customary to take four, 50 pound samples (200 pounds total) at random from each 25 ton load. Thus some 48 million pounds of tomatoes have been inspected per season.

The tomatoes are subject to inspection for various defects, particularly:

1. worm damage
2. mold
3. green color
4. general defects (sunburn, sun scald, overripe, etc.)
5. dirt
6. mechanical damage (fruit broken)
7. extraneous material (vines, weeds, etc.)
8. minor imperfections (gray wall, internal discoloration, etc.).

Furthermore, small proportions of the tomatoes are particularly inspected for color and for peelability. This type of inspection operation requires a great deal of time, a large number of people, considerable equipment and is relatively expensive.

It is therefore an object of the invention to provide a fruit sub-sampler and grading table effective to reduce the amount of time involved, the number of inspectors involved, and to provide at least as good a result as heretofore obtained, and preferably a better result.

Another object of the invention is to provide a device as indicated which will contribute toward relatively uniform results despite the fact that various individual inspectors are utilized.

A further object of the invention is to provide a sub-sampler and grading table which itself will not injure nor contribute to downgrading the fruit handled.

Another object of the invention is to provide a fruit sub-sampler and grading table which can readily be constructed in a simple, straightforward fashion and which can be operated for a protracted period without substantial service and will require service only by semi-skilled individuals.

A further object of the invention is to provide a fruit sub-sampler and grading table which can operate and be maintained in a sanitary and acceptable condition.

Another object of the invention is to provide a device which can be operated at speeds or in a manner to conform to the individual preferences of the inspectors.

A further object of the invention is to provide a device in which a suitable readout of defective fruit can be made continuously or as desired.

A further object of the invention is in general to provide an improved fruit sub-sampler and grading table.

Other objects, together with the foregoing, are attained in the embodiment of the invention described in the accompanying description and illustrated in the accompanying drawings, in which:

FIG. 2 is a cross-section, the plane of which is indicated by the line 2—2 of FIG. 1, certain portions of the structure being omitted for clarity and certain other portions being illustrated diagrammatically; and FIG. 3 is a fragmentary cross-section, the plane of which is vertical and longitudinal through the drum end pans.

Figure 1:
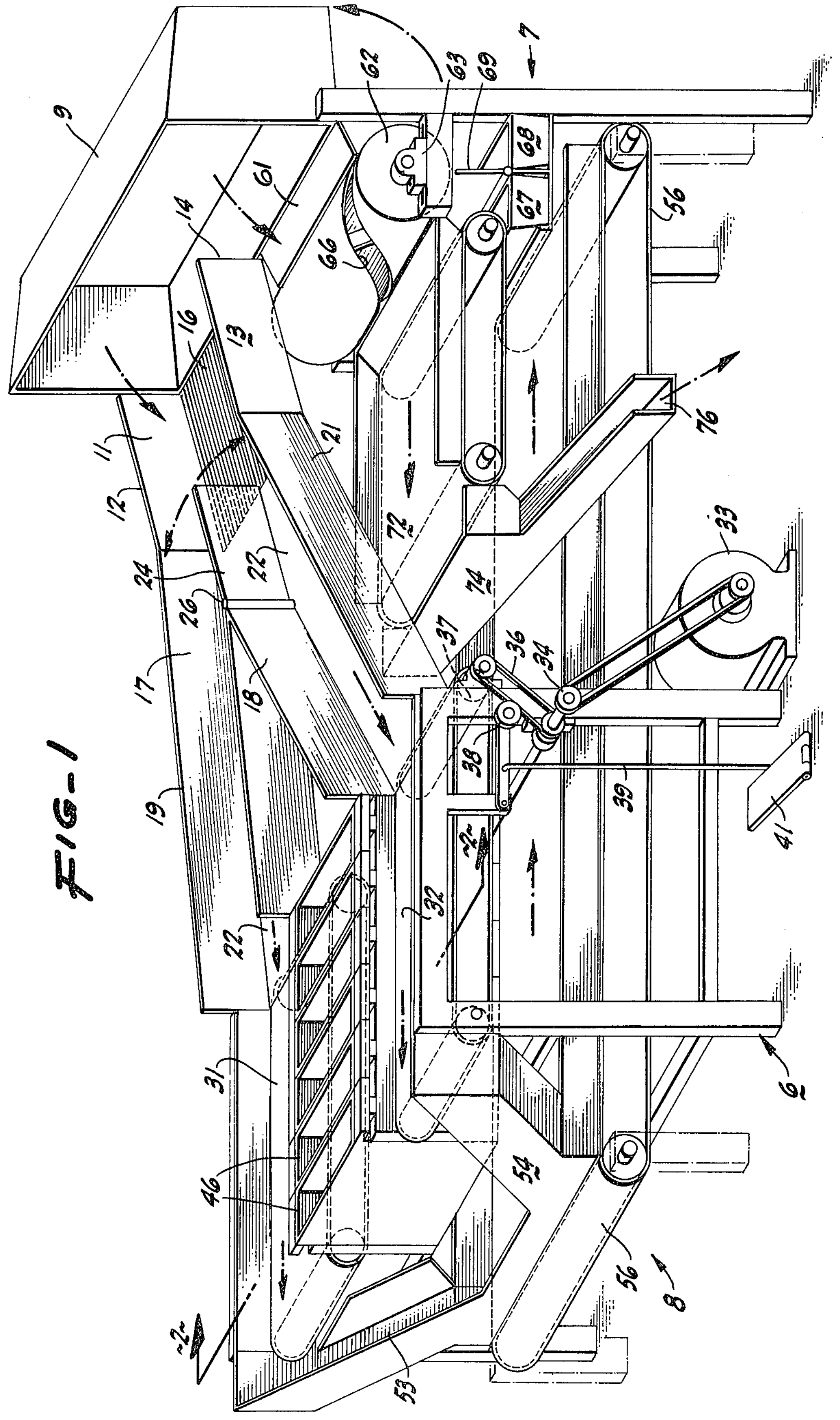
FIG. 1 is an isometric perspective of one form of fruit sub-sampler and grading table constructed in accordance with the invention.

While the fruit sub-sampler and grading table disclosed herein can be applied to various different fruits, it has with success been applied to the handling of canning tomatoes in substantial quantities.

In embodying the invention, there is preferably provided at a suitable location, such as a grading station, a framework 6 resting on the floor and comprised of the customary metal shapes arranged to afford an adequate support. The major working areas are generally at about waist height and extend longitudinally from an entrance end 7 to a discharge end 8. The framework is of sufficient width to accommodate an initial container 9 which can readily be pivotally mounted at the entrance end of the frame and has a sufficient capacity to receive the contents of a fifty-pound lug box of tomatoes. The container 9 is usually situated in a horizontal aspect and a lug box of tomatoes is dumped therein, or a continuous belt conveyor (not shown) is arranged to discharge into the container 9.

When the container is charged with a sample, the operator pivots the container from its horizontal position into its upright position as shown in FIG. 1. This operation causes the plurality of fruit in the container to discharge at random and by gravity the discharged fruit moving from the entrance end toward the exit end of the frame. The supply, constituted by the whole sample discharged from the container 9, is initially divided into two streams. For that reason there is provided on the frame 6 a chute 11 extending transversely for about one-half the width of the container 9 and bounded by a side wall 12 and an upstanding side wall 13. The leading edge 14 of the wall 13 acts as a divider to direct a transverse half of the sample through the chute 11 and over a downwardly inclined grate 16. This is comprised of spaced-apart slats through which debris such as dirt and the like can discharge but which supports and guides the first sample stream toward the exit end.

The first stream in turn is split. For that reason, the chute 11 diverges into a first channel 17 and a second channel 18. The channels are substantially identical and each is defined by its own ones of a pair of side walls 19 and 21. The walls 19 and 21 are spanned by bottom walls 22 inclined downwardly toward the exit end so that the fruit advances by gravity through the chutes, which thereby define a primary path in the first channel 17 and a secondary path in the secondary channel 18.

Normally, the amount of fruit in each path is substantially the same, but at the apex or convergence of two of the walls 19 and 21 there is provided a splitting wall 24 extending upstream from a pivot mounting 26 at the apex of the walls. By moving the wall 24 to either extreme position, either of the paths can be segregated, or, by positioning the wall 24 in its central position, as shown, the division of the fruit is even, or by moving the wall 24 part way toward one wall or the other the fruit can be divided into corresponding portions.

The primary path in the chute 17 is continued over a primary belt conveyor 31 extending along one side of the frame in a generally horizontal attitude and leads from the discharge of the chute 17 to a point near the exit end of the frame. Quite similarly, there is provided on the frame a secondary belt conveyor 32 comparably mounted in a generally horizontal location and operating as a continuation of the secondary path to a point near the exit end of the machine. Each of the belts is provided with a power drive from a motor 33 operating a jack shaft 34 extending across the frame 6.

At its opposite ends the jack shaft has individual drive belts 36 to the individual drive rollers 37 of the separate belt conveyors. The drive belts 36 on the opposite sides of the machine are individually controlled to transmit driving force by the provision of individual idler pulleys 38 on levers controlled through rods 39 by treadles 41. These are appropriately located for the individual inspectors standing opposite each other on the opposite sides of the machine. Thus, an individual inspector, even though the single motor 33 drives both belts, can, by depression of the local treadle 41, govern the momentary speed of the respective individual one of the belts 31 and 32.

As the fruits advance on the primary and secondary belts, the inspectors visually grade them and remove defective ones by hand and toss the removed fruit into any proper one of a plurality of fruit containers, such as 46, arranged between the belts and disposed side by side. In the present instance, there are six such containers for the receipt of six different categories of rejected fruit. Each of the removable containers 46 is particularly mounted on the frame 6 through the medium of a load cell 47, the individual load cells being joined by conductors 48 to a selector switch 49 leading to a digital readout 51. With this arrangement, the momentary weight of any one of the individual reject containers can be displayed on the readout 51.

Fruit which has not been removed by hand from the primary and secondary belts rolls over the end thereof into transverse ducts 53 and 54 guiding the discharged fruit by gravity onto a lower, return conveyor belt 56 extending for substantially the entire length of the machine and operating in a reverse direction to convey the fruit thereon from the exit end of the machine toward the entrance end thereof. The return fruit discharging from the return belt 56 is sometimes carried directly back to the load from which it was initially sampled or is delivered directly to the cannery by appropriate means, not shown.

With this much of the structure the inspectors are supplied with well-divided fractions of the samples and are able at their own individual speed easily to remove the defective or sub-grade fruit from the two visual inspection belt conveyors and can put them into the individual reject containers without difficulty. The amount of rejects for the particular sample is instantly indicated by the readout 51, so that the grade of the load from which the samples were taken is readily ascertained.

Since only half of the sample from the four successive fifty-pound lugs dumped into the container 9 passes through the first division, the machine has means for taking care of the other half thereof.

When the container 9 is upended to discharge its contained sample, the second half of the sample, as divided by the divider 14, is advanced by gravity in a second stream. This flows over an apron 61 substantially even with the bottom of the tipped container 9 but trending downwardly for gravital advance of the fruit. The apron 61 leads over a segregating drum 62 which is sometimes referred to as a random sampler. The drum is mounted transversely to rotate on bearings 63 at its opposite ends, the bearings being supported on the frame 6 at any one of several longitudinal positions with respect to the apron 61. The drum is a thin-walled tube having in its wall at least one helical slot 66 winding between the drum ends and of a width easily to pass the fruit, which otherwise would travel thereover.

The drum is revolved by a power drive (not shown). Fruit which advances over the drum from the apron 16 is permitted to drop through the subjacent slot or slots 66 at random, in effect openings being afforded at different locations axially of the drum as the drum revolves. The fruit within the drum falls out through the slot when the slot is at the bottom of the drum and may fall into one or more pans 67 and 68.

There is preferably a pivoted divider 69 upstanding from the frame between the pans 67 and 68. Some of the randomly selected fruit dropping through the drum slots 66 may fall into the pan 67 for color test or may fall into the pan 68 for peelability test. The relative proportion of the dropping fruit so directed is governed by the angular position of the plate 69. The pans 67 and 68 are simply held removably in position so they can from time to time be taken away to transport the randomly selected, second portion of the sample to the laboratory.

Most of the fruit does not pass through the slot 66, but simply rolls over the drum and is received on a belt conveyor 72 to advance toward the exit end of the machine. Under some circumstances, the fruit so advanced simply falls over one of the belt-supporting rollers and is caught and returned by the return belt 56. Under other circumstances, there is provided one or more intercepting ducts such as the duct 74 extending transversely of the frame and arranged to discharge fruit from the belt 72 by gravity through one or more side outlets such as the outlet 76 for further handling, particularly to obtain a sample of selected proportion for examination as to peelability.

With this second portion of the sample for random selection, the amount of the segregated fruit going to the pans 67 and 68 can be adjusted by moving the bearings 63 toward and away from the frame entrance 7. When the drum is more nearly protected under the apron 61, more of the fruit tends to go over the drum rather than through it. When the bearings 63 are set away from the entrance posts 7, the fruit tends to travel over more of the top of the drum with a greater opportunity to fall through the slot 66.

With the arrangement as described and in practice, the amount of time and effort for grading has been markedly reduced and the process has been speeded considerably with no loss of accuracy and in many instances with an increase in accuracy.

What is claimed is:

1. A fruit sub-sampler and grading table comprising a frame having an entrance end and an exit end, means for delivering by gravity a randomly arranged supply of a plurality of fruit to said entrance end, means for dividing said supply into a continuously running first random stream and a continuously running second random stream, means for advancing said first stream on said table toward said exit end, means for splitting said advancing first random stream into a primary stream in a primary path and a secondary stream in a secondary path, said paths being separated by an intervening space, means on said frame for automatically segregating a fractional quantity of fruit from said second stream, and means for varying said fractional quantity, primary and secondary belt conveyors on said frame defining portions of said primary and secondary paths, means for advancing said belt conveyors, and plural container means in said space for receiving fruit.

2. A device as in claim 1 including means for advancing on said frame fruit in said second stream not segregated therefrom.

3. A device as in claim 1 including a return belt conveyor on said frame in position beneath said primary and secondary belt conveyors, and means for directing fruit discharged from said primary and secondary belt conveyors onto said return belt conveyor.

4. A device as in claim 3 including means for directing fruit from said second stream to said return belt conveyor.

5. A device as in claim 4 including means for intercepting fruit from said second stream and diverting intercepted fruit from said return belt conveyor.

6. A device as in claim 1 in which said receiving means includes a plurality of fruit containers separated from each other in the direction of advance of said streams and each of said containers extending substantially from dais primary path to said secondary path, said fruit containers being supported on said frame by individual load cells.

7. A device as in claim 6 including a load display device, and means for selectively connecting said load cells thereto.

8. A device as in claim 1 in which said means for advancing said belt conveyors includes means for individually varying the speed of one of said belt conveyors with respect to the speed of the other of said belt conveyors.

9. A device as in claim 1 in which said segregating means includes a rotary drum having at least one helical slot therein.

10. A device as in claim 9 including an apron on said frame in position to guide said second stream to the top of said drum.

11. A device as in claim 10 including means for variously positioning said drum relative to said apron.

* * * * *